(12) United States Patent
Saito (10) Patent No.: US 8,068,144 B2
(45) Date of Patent: Nov. 29, 2011

(54) IMAGE RECORDING AND REPRODUCING APPARATUS

(75) Inventor: Tetsuji Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 12/415,894

(22) Filed: Mar. 31, 2009

(65) Prior Publication Data

US 2009/0244306 A1    Oct. 1, 2009

(30) Foreign Application Priority Data

Mar. 31, 2008  (JP) ................................ 2008-092367
Mar. 31, 2008  (JP) ................................ 2008-092368

(51) Int. Cl.
| | |
|---|---|
| H04N 5/225 | (2006.01) |
| H04N 5/76 | (2006.01) |
| H04N 5/238 | (2006.01) |
| H04N 5/335 | (2011.01) |
| H04N 5/77 | (2006.01) |

(52) U.S. Cl. ............. 348/220.1; 348/231.2; 348/333.02; 348/333.12; 348/296; 386/235; 386/224; 386/225

(58) Field of Classification Search ............... 348/220.1, 348/296–297, 221.1–225.1, 362–371, 154–155, 348/208.99–208.16, 352, 231.2, 333.02, 348/333.12; 386/235, 239, 278, 279, 209, 386/210, 224, 225, 227, 228, 229
See application file for complete search history.

(56) References Cited

U.S. PATENT DOCUMENTS

2005/0237422 A1 * 10/2005 Kido ............................ 348/362
2008/0309778 A1 * 12/2008 Tabatabai et al. .......... 348/222.1

FOREIGN PATENT DOCUMENTS

| JP | 2001-054053 |   | 2/2001 |
|---|---|---|---|
| JP | 2001054053 A | * | 2/2001 |
| JP | 2001-103361 |   | 4/2001 |
| JP | 2001103361 A | * | 4/2001 |

* cited by examiner

Primary Examiner — Lin Ye
Assistant Examiner — Marly Camargo (57) ABSTRACT

An image recording and reproducing apparatus that records and reproduces image data shot at a frame rate higher than a normal reproduction rate employed during reproduction of a moving image can generate a still image by attaching still image recording information to at least one frame image included in the recorded image data and combining a plurality of frame images of the recorded image data in accordance with the still image recording information.

10 Claims, 9 Drawing Sheets

| | |
|---|---|
| FILE NAME | IMG_0999.JPG |
| MANUFACTURER | XXX |
| MODEL | XXX TV001 |
| SHOOTING DATE/TIME | 01/28/2007 17:10 |
| CAPTURING DATE/TIME | 07/05/2007 16:26 |
| IMAGE SIZE | 2250 × 4000 |
| FLASH | NOT USED |
| FOCAL LENGTH | 5.8 MM |
| SHUTTER SPEED | 1/60 SEC |
| ISO SPEED RATINGS | 100 |
| APERTURE | F2.8 |
| LENS OPEN F NUMBER | F2.8 |
| LIGHT METERING MODE | MULTI-ZONE METERING |
| IMAGE CAPTURING MODE | MANUAL |
| USED LENS | 5.8 MM - 17.4 MM |
| WHITE BALANCE | AUTO |
| FOCUS MODE | SINGLE FOCUS |
| LIGHT METERING METHOD | EVALUATION METERING |
| | : |

IMAGE RECORDING AND REPRODUCING APPARATUS

BACKGROUND OF THE INVENTION

1. Field of the Invention

The present invention relates generally to image recording and reproducing apparatuses. More particularly, a technique for recording and reproducing high frame rate images resulting from high speed image shooting.

2. Description of the Related Art

Digital cameras for capturing images of a subject, converting the captured image into image data, and recording the image data on recording media are widely used. Such digital cameras are categorized into digital still cameras that mainly capture still images and digital video cameras that mainly capture moving images.

Digital cameras having a still image shooting function and a moving image shooting function have been developed recently. In one method for simultaneously recording moving images and still images, one frame of a moving image is recorded as a still image during shooting of the moving image. Japanese Patent Laid-Open No. 2001-103361 discloses one example of such digital cameras.

The digital camera disclosed in Japanese Patent Laid-Open No. 2001-103361 switches an operation mode thereof into a still image shooting mode from a moving image shooting mode in response to pressing of a still image shooting button during shooting of a moving image and shoots a still image by still image shooting conditions. A user can shoot a still image at the right moment to shoot a good still image using such a digital camera during shooting of a moving image.

However, since shooting of a moving image is temporarily suspended when a still image is shot in the method disclosed in Japanese Patent Laid-Open No. 2001-103361, loss of frames may affect the recorded moving image.

On the other hand, Japanese Patent Laid-Open No. 2001-054053 discloses an example of a reproducing apparatus for reproducing a recorded moving image. The reproducing apparatus captures one frame of the reproduced moving image as a still image.

The still image capturing apparatus disclosed in Japanese Patent Laid-Open No. 2001-054053 temporarily stores a reproduced frame image displayed on a display screen in a storage device, thereby capturing a still image. In addition, the apparatus disclosed in Japanese Patent Laid-Open No. 2001-054053 allows a user to set a time interval between capturing of frame images and a size of the storage device. As a result, the apparatus can selectively capture frame images that the user wants to capture.

However, the technique disclosed in Japanese Patent Laid-Open No. 2001-054053 is for simply extracting one frame of a reproduced moving image. If an interval between frames of the reproduced moving image is set approximately equal to $1/30$ seconds, the apparatus is unable to capture another still image after at least $1/30$ seconds elapses since capturing of one still image. Furthermore, long and short time still image capturing, which can be realized by changing the shutter speed as in digital cameras having a still image shooting function, is not available.

SUMMARY OF THE INVENTION

An embodiment of the present invention provides an image recording and reproducing apparatus capable of recording image data of still images without affecting continuity of a moving image that is being recorded.

Another embodiment of the present invention also provides an image recording and reproducing apparatus capable of setting a still image capturing condition corresponding to a pseudo-shutter speed when capturing still images from recorded image data.

According to an aspect of the present invention, an image recording and reproducing apparatus that records and reproduces image data shot at a frame rate higher than a normal reproduction rate employed during reproduction of a moving image includes, a moving image storage period setting unit configured to set a moving image storage period in order to determine the number of frame images to be combined when the image data is reproduced as a moving image, a still image storage period setting unit configured to set a still image storage period in order to set the number of frame images to be combined when the image data is reproduced as a still image, a parameter attaching unit configured to attach a parameter indicating the moving image storage period and a parameter indicating the still image storage period to each frame image of the image data, an image recording unit configured to record the image data attached with the parameters by the parameter attaching unit, and a still image recording instructing unit configured to give an instruction to start recording a still image. The parameter attaching unit attaches information indicating the start of recording of the still image to a frame image of the image data in response to the still image recording start instruction received during a recording operation performed by the image recording unit.

According to another aspect of the present invention, an image recording and reproducing apparatus that records and reproduces moving image data shot at a frame rate higher than a normal reproduction rate employed during reproduction of a moving image includes, a generating unit configured to combine a plurality of frame images included in the moving image data recorded on a recording medium to generate a frame image to be displayed, a still image capturing condition setting unit configured to set a still image capturing condition for determining the number of frame images to be combined when the moving image data is reproduced as a still image, a still image capturing instructing unit configured to give an instruction to start capturing a still image, and a controlling unit configured to perform, in response to the still image capturing start instruction received during a reproduction operation performed using the frame image generated by the generating unit, a control operation to select a plurality of frame images and record a still image resulting from combination of the plurality of selected frame images. The number of frame images to be combined is determined in accordance with the still image capturing condition set by the still image capturing condition setting unit.

Further features of the present invention will become apparent from the following description of exemplary embodiments with reference to the attached drawings.

DESCRIPTION OF THE EMBODIMENTS

Exemplary embodiments of the present invention will be described in detail below with reference to the accompanying drawings.

Figure 1:
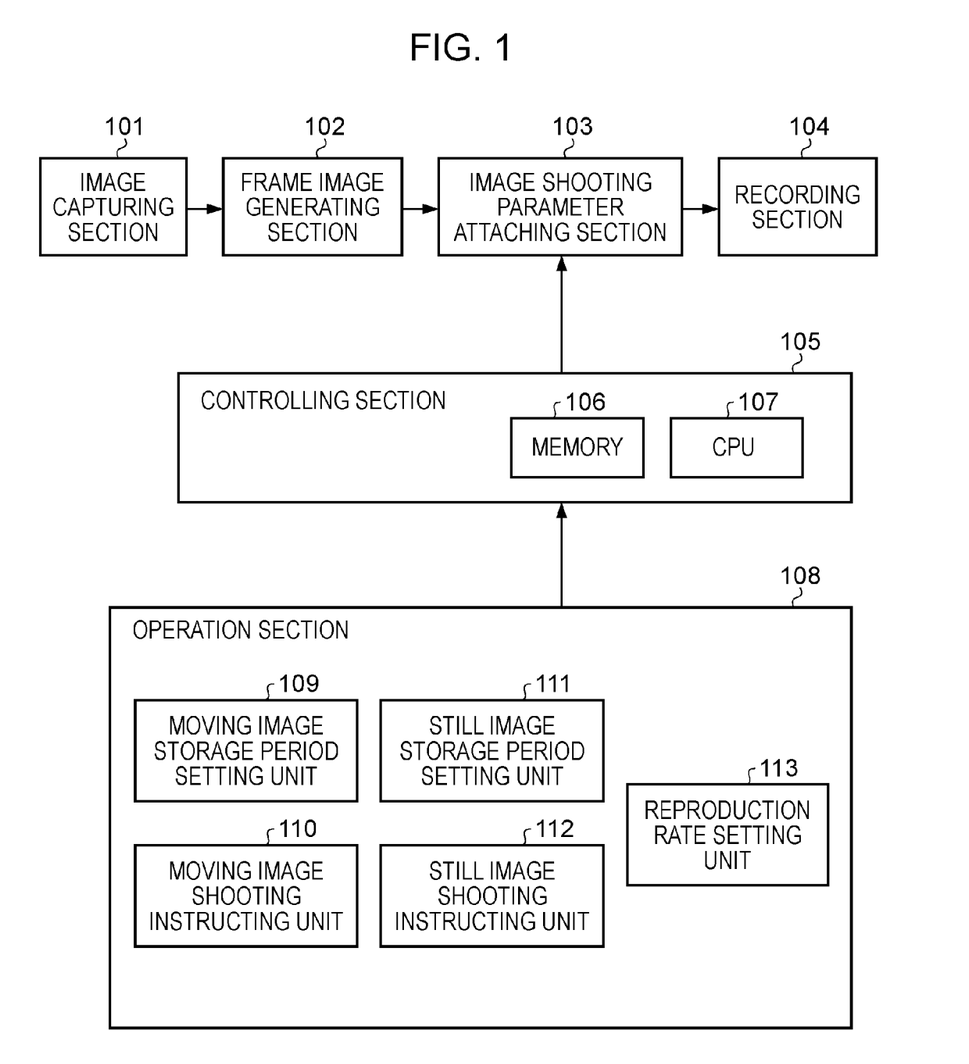
FIG. 1 is a block diagram showing a schematic configuration of a digital camera serving as an image recording and reproducing apparatus according to a first exemplary embodiment of the present invention.

FIG. 1 is a block diagram showing a schematic configuration of a digital camera serving as an image recording and reproducing apparatus according to a first exemplary embodiment of the present invention.

The digital camera can perform image shooting at a speed higher than a normal reproduction rate (vertical frequency) employed in reproduction of a recorded moving image and simultaneously record still images and moving images. More specifically, the digital camera can record image data of still images while maintaining continuity of a moving image that is being recorded. Image data that is shot at a high speed and recorded by the digital camera shown in FIG. 1 is a high frame rate image data.

Figure 2:
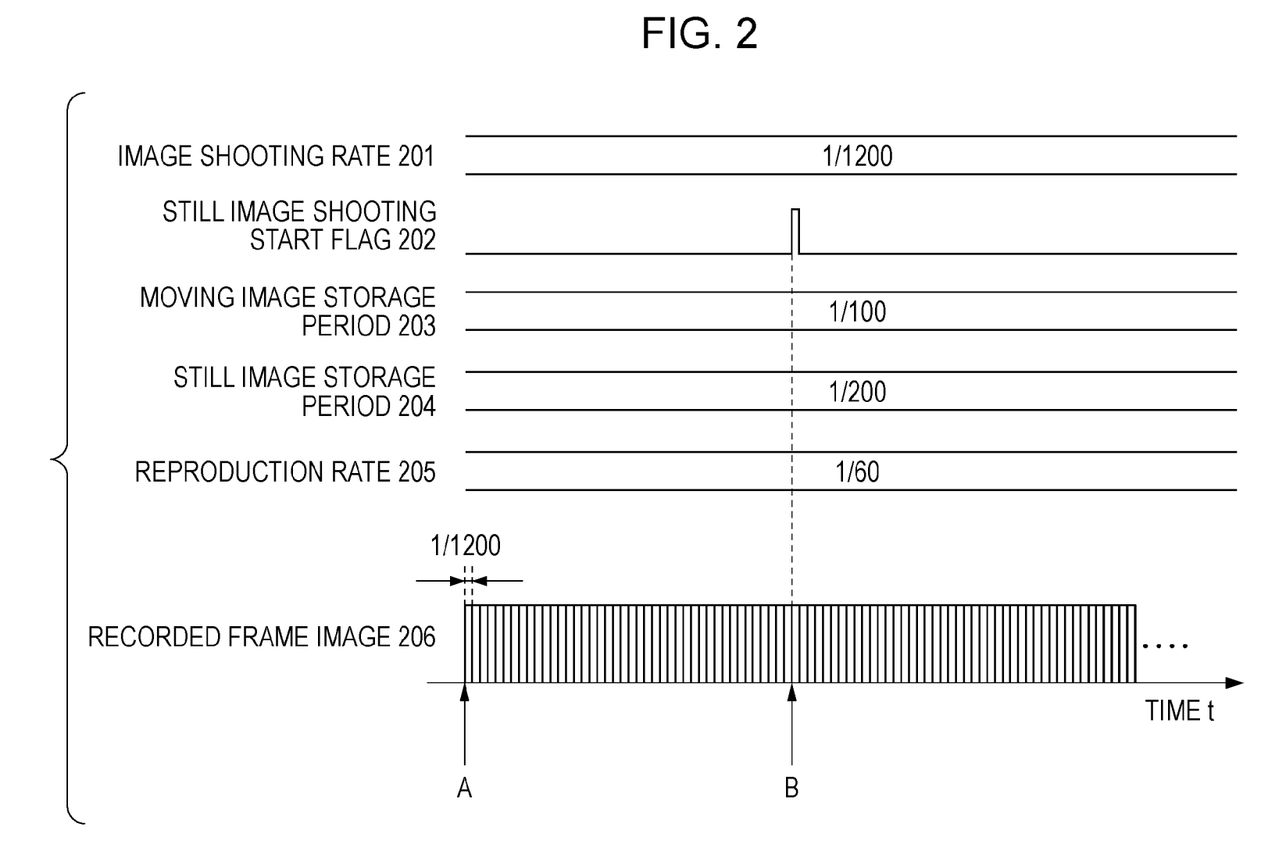
FIG. 2 is a chart showing an image data set recorded by a digital camera shown in FIG. 1.

FIG. 2 is a chart showing an image data set recorded by the digital camera shown in FIG. 1. FIG. 2 shows the data set using the horizontal axis representing time T.

The first exemplary embodiment will be described below with reference to FIGS. 1 and 2.

Referring to FIG. 1, the digital camera performs image shooting at a speed higher than a reproduction rate employed in reproduction of a recorded moving image and records image data including both of a still image component and a moving image component. The digital camera includes an image capturing section 101, a frame image generating section 102, an image shooting parameter attaching section 103, a recording section 104, a controlling section 105, and an operation section 108.

The controlling section 105 has a memory 106 and a central processing unit (CPU) 107. The operation section 108 has a moving image storage period setting unit 109, a moving image shooting instructing unit 110, a still image storage period setting unit 111, a still image shooting instructing unit 112, and a reproduction rate setting unit 113.

It is assumed that a user previously sets a moving image storage period 203 and a still image storage period 204 shown in FIG. 2 equal to $1/100$ (sec) and $1/200$ (sec) through the moving image storage period setting unit 109 and the still image storage period setting unit 111, respectively. It is also assumed that a reproduction rate 205 intended by the user during reproduction of a recorded moving image is previously set equal to $1/60$ (sec) by the user through the reproduction rate setting unit 113. The user can designate an arbitrary set value by each instructing unit in the operation section 108.

Upon the user giving an instruction to start shooting (recording) a moving image through the moving image shooting instructing unit 110 (corresponding to a time point A shown in FIG. 2), the frame image generating section 102 digitalizes an analog output signal having undergone photoelectric conversion in the image capturing section 101, which includes an image pickup element, such as a charge coupled device (CCD), and an optical system, to generate continuous frame images. Here, it is assumed that an image shooting rate 201 is set equal to $1/1200$ (sec).

The CPU 107 of the controlling section 105 sets the image shooting rate 201 ($1/1200$ sec), the moving image storage period 203 ($1/100$ sec), the still image storage period 204 ($1/200$ sec), and the reproduction rate 205 ($1/60$ sec) as image shooting parameters. Here, the moving image storage period 203 corresponds to the shutter speed for moving images. Additionally, the still image storage period 204 corresponds to the shutter speed for still images.

The CPU 107 of the controlling section 105 controls various operations in accordance with application programs stored in the memory 106.

The image shooting parameter attaching section 103 associates the various parameters set by the controlling section 105 with each frame image output from the frame image generating section 102. For example, the parameters may be embedded in a blanking period of frame images. The recording section 104 stores the frame images attached with the parameters indicating the moving image storage period 203 and the image shooting rate 201 as moving image data. The moving image to be recorded is constituted by a plurality of continuous frame images (recorded frame images 206) obtained during shooting of the moving image.

If a user gives an instruction to start shooting (recording) a still image through the still image shooting instructing unit 112 during recording of a moving image (corresponding to a time point B shown in FIG. 2), the CPU 107 sets a still image shooting start flag 202, which indicates that shooting of a still image has been instructed. The image shooting parameter attaching section 103 attaches the still image shooting start flag 202 to a frame image to be recorded at the time point B shown in FIG. 2 as one of the image shooting parameters. Even if shooting of a still image is instructed, an operation for recording a moving image is continued.

Although the image shooting parameters are attached to a blanking period of each frame of a moving image in this exemplary embodiment, the image shooting parameters may be attached to a header or a footer of a moving image file or may be generated, separately from an image file, as a management file that records a processing flow.

As described above, in this exemplary embodiment, the moving image storage period 203, the still image storage period 204, and the still image shooting start flag 202 are stored, as image shooting parameters, in association with frame images that are recorded at a high frame rate when a moving image and still images are shot at the same time.

In this manner, still images can be recorded without affecting a moving image currently being shot and recorded. Different shutter speeds can be set for the still images and the moving image. In addition, since the reproduction rate 205 and the image shooting rate 201 are also stored, an reproducing apparatus (e.g., a moving image/still image reproduced frame generating section 300 shown in FIG. 3) can be informed with the reproduction rate 205 intended by the user and can reproduce the moving image and the still images.

The user can set the moving image storage period, the still image storage period, and the reproduction rate freely or a system may store some predetermined values for the moving image storage period, the still image storage period, and the reproduction rate.

A second exemplary embodiment of the present invention will now be described.

Figure 3:
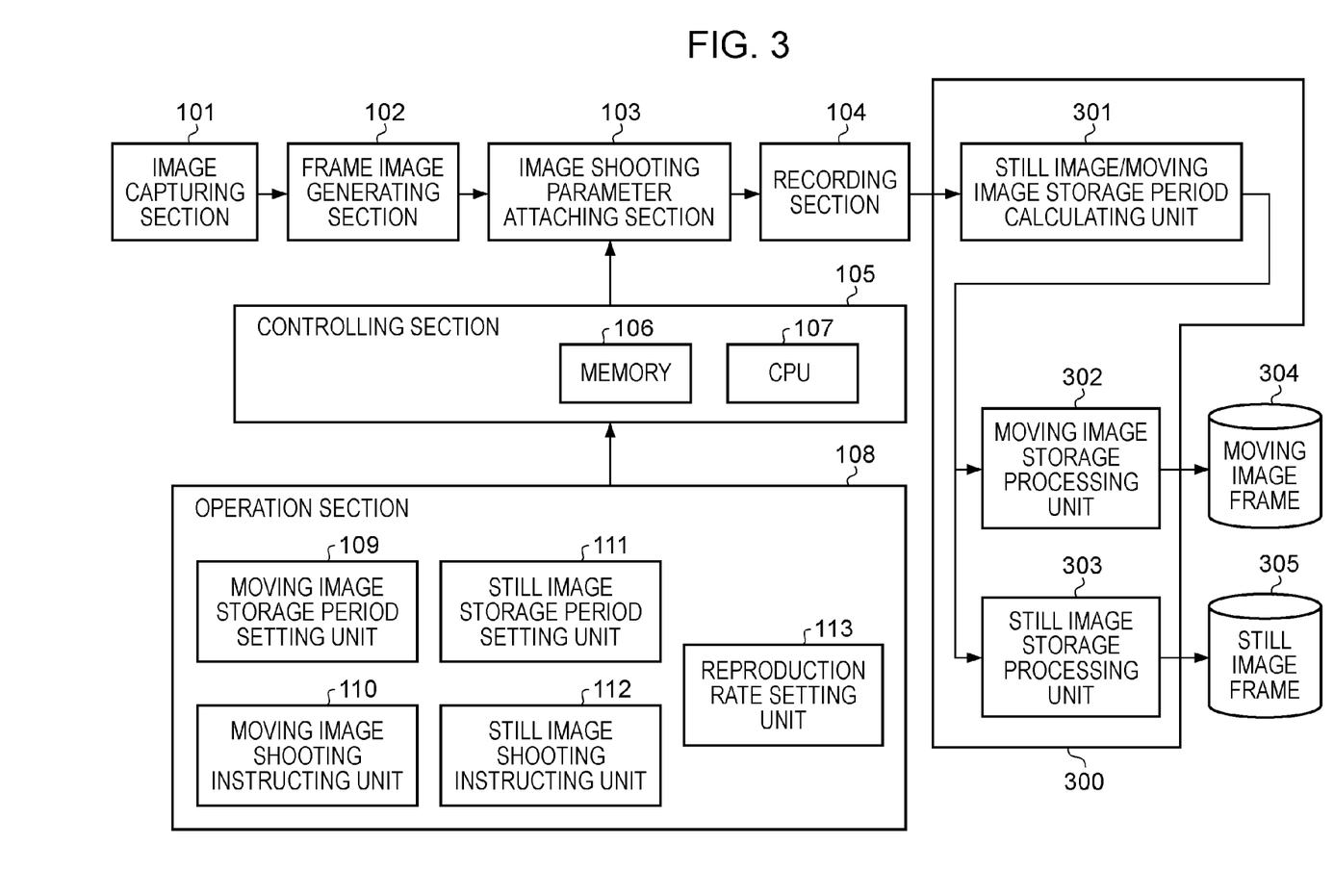
FIG. 3 is a block diagram showing a schematic configuration of a digital camera serving as an image recording and reproducing apparatus according to a second exemplary embodiment of the present invention.
Figure 4:
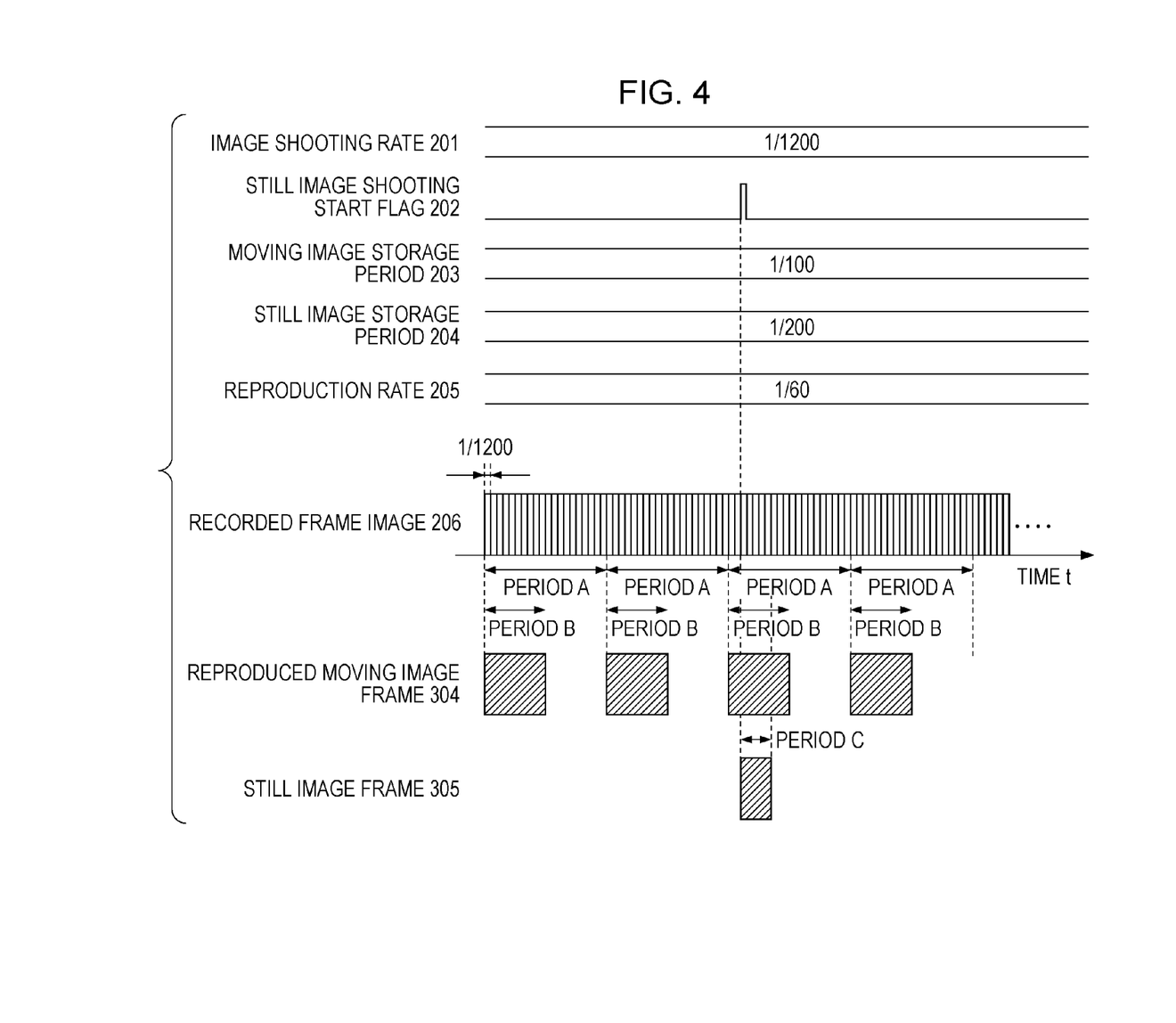
FIG. 4 is a chart showing an image data set recorded by a digital camera shown in FIG. 3.

FIG. 3 is a block diagram showing a schematic configuration of a digital camera serving as an image recording and reproducing apparatus according to the second exemplary embodiment of the present invention. FIG. 4 is a chart showing an image data set recorded by the digital camera shown in FIG. 3. The second exemplary embodiment relates to an apparatus further having a moving image/still image reproduced frame generating section 300, which is a block for generating moving image frames and still image frames reproduced from an image data set obtained by a digital camera according to the first exemplary embodiment shown in FIG. 1. A description regarding functional blocks, commonly shown in FIGS. 1 and 3, attached with like or similar references is omitted.

Referring to FIG. 3, the moving image/still image reproduced frame generating section 300 includes a still image/moving image storage period calculating unit 301, a moving image storage processing unit 302, and a still image storage processing unit 303.

An example method in which the moving image/still image reproduced frame generating unit 300 generates moving image frames 304 and still image frames 305 reproduced from an image data set obtained by a digital camera will be described.

As shown in FIG. 4, a recording section 104 stores recorded frame images 206 attached with parameters, such as an image shooting rate 201 ($1/1200$ sec), a moving image storage period 203 ($1/100$ sec), a still image storage period 204 ($1/200$ sec), and a reproduction rate 205 ($1/60$ sec), as moving image data. It is assumed that some frame images are also attached with a still image shooting start flag 202.

The still image/moving image storage period calculating unit 301 reads out data from the recording section 104. After reading out the data, the still image/moving image storage period calculating unit 301 calculates a period A, which indicates the number of recorded frame images corresponding to the reproduction rate intended by a user. In the example shown in FIG. 4, the period A corresponds to 1200/60=20 frames.

The still image/moving image storage period calculating unit 301 then calculates, for every 20 frames, a period B, which indicates the number of recorded frame images corresponding to the moving image storage period 203. In this case, the period B corresponds to 1200/100=12 frames.

For each period A (20 frames), the moving image storage processing unit 302 generates the continuous moving image frames 304 on the basis of the period B (12 frames). The generated moving image frames 304 can be displayed on a display device, not shown.

Upon detecting existence of the still image shooting start flag 202, the still image/moving image storage period calculating unit 301 calculates a period C starting from a time point of the frame image associated with the still image shooting start flag 202. The period C indicates the number of recorded frame images corresponding to a period regarding which a still image is generated. The period C is calculated on the basis of the still image storage period 204. In this case, the period C corresponds to 1200/200=6 frames. The still image storage processing unit 303 generates the still image frame 305 from recorded frame images corresponding to the period C (6 frames) starting from the time point of the still image shooting start flag 202. The generated still image frame 305 can be also displayed on a display device, not shown.

As described above, according to this exemplary embodiment, moving images and still images can be generated and reproduced from recorded frame images on the basis of parameters attached to the recorded frame images.

A third exemplary embodiment of the present invention will now be described.

Figure 5:
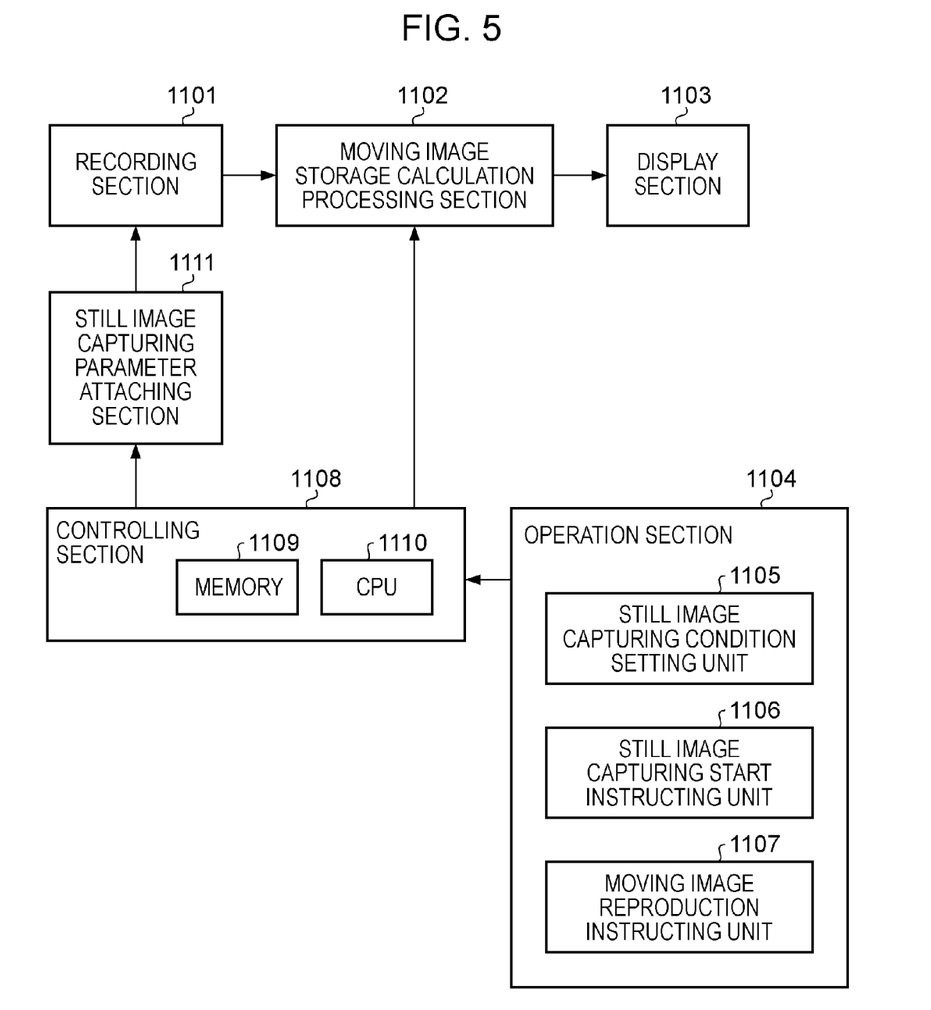
FIG. 5 is a block diagram showing a schematic configuration of an image recording and reproducing apparatus according to a third exemplary embodiment of the present invention.
Figure 6:
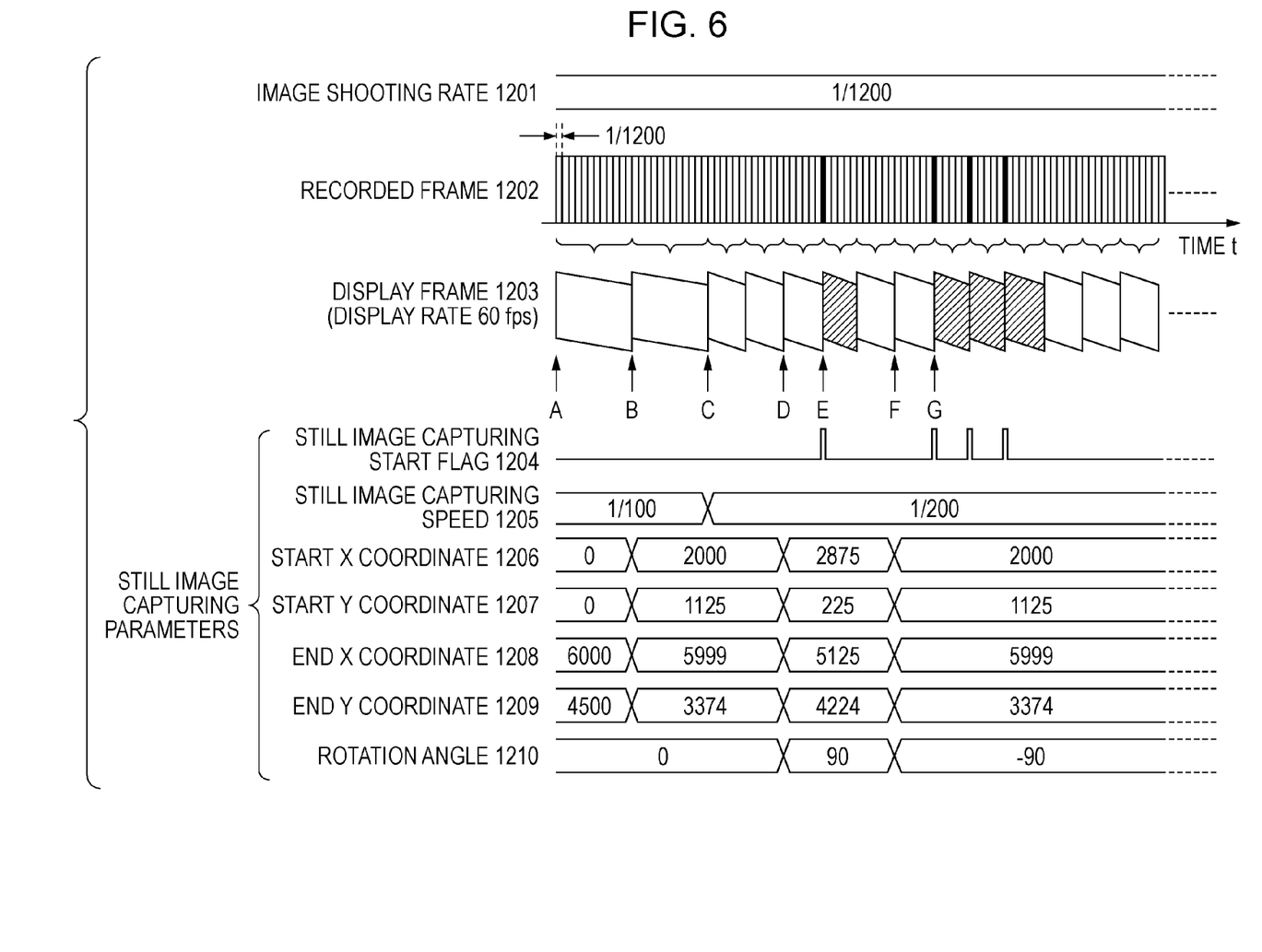
FIG. 6 is a chart showing an image data set recorded by an image recording and reproducing apparatus shown in FIG. 5, still image capturing parameters, and a relationship between recorded frames and displayed frames.

FIG. 5 is a block diagram showing a schematic configuration of an image recording and reproducing apparatus according to the third exemplary embodiment of the present invention. FIG. 6 is a chart showing an image data set recorded by the image recording and reproducing apparatus shown in FIG. 5, still image capturing parameters, and a relationship between recorded frames and displayed frames. FIG. 6 is a chart showing a relationship between image data and capturing parameters associated with each frame image using the horizontal axis representing time T.

Referring to FIG. 5, the image recording and reproducing apparatus according to this exemplary embodiment can reproduce frame images that have been recorded at a speed higher than a normal reproduction rate (vertical frequency) employed in reproduction of a recorded moving image. The image recording and reproducing apparatus shown in FIG. 5 includes a recording section 1101, a moving image storage calculation processing section 1102, a display section (display) 1103, an operation section 1104, a controlling section 1108, and a still image capturing parameter attaching section 1111.

The operation section 1104 has a still image capturing condition setting unit 1105, a still image capturing start instructing unit 1106, and a moving image reproduction instructing unit 1107. The controlling section 1108 has a memory 1109 and a CPU 1110.

The recording section 1101 stores moving image data (resolution thereof is equal to 8000×4500) like recorded frames 1202 shown in FIG. 6. The recorded frames 1202 are moving image data having a high frame rate of, for example, $1/1200$ (sec). The recorded frames 1202 are stored in association with a parameter indicating an image shooting rate 1201 (in this case, $1/1200$ sec) that is attached to frame images shot by a high speed image shooting apparatus shown in FIG. 1.

On the other hand, a user previously sets a still image capturing speed equal to $1/100$ (sec) through the still image capturing condition setting unit 1105 of the operation section 1104. A display rate employed by the display section 1103 for displaying reproduced images is set equal to $1/60$ (sec).

Here, the still image capturing speed corresponds to a reproduction shutter speed, namely, a pseudo shutter speed, that is different from the image shooting shutter speed. The image recording and reproducing apparatus according to the exemplary embodiment records high frame rate moving image data and captures a still image from a reproduced video displayed on a display device by appropriately specifying the reproduction shutter speed (still image capturing speed).

A user gives an instruction to reproduce a moving image through the moving image reproduction instructing unit 1107 of the operation section 1104. The moving image storage calculation processing section 1102 performs following calculation processing in accordance with a previously set still image capturing speed 1205 ($1/100$ sec).

More specifically, the moving image storage calculation processing section 1102 calculates a storage period (1200/100=12 frames) of the recorded frames 1202 on the basis of the image shooting rate 1201 and the still image capturing speed 1205, selects and adds the recorded frames 1202 corresponding to the calculated period to generate display frames 1203.

The generated display frames 1203 are displayed on the display section 1103 in accordance with the display rate and the resolution of the display section 1103 (after a time point A shown in FIG. 6). The user then gives an instruction to enlarge the reproduced moving image (2×zoom) through the still image capturing condition setting unit 1105 of the operation section 1104.

The still image capturing condition setting unit 1105 is for setting still image capturing parameters that define a still image storage period.

Values of trimming start coordinates (a start X coordinate 1206 and a start Y coordinate 1207) and values of trimming end coordinates (an end X coordinate 1208 and an end Y coordinate 1209), which are kinds of capturing parameters associated with frame images, change (at a time point B shown in FIG. 6).

Figure 7:
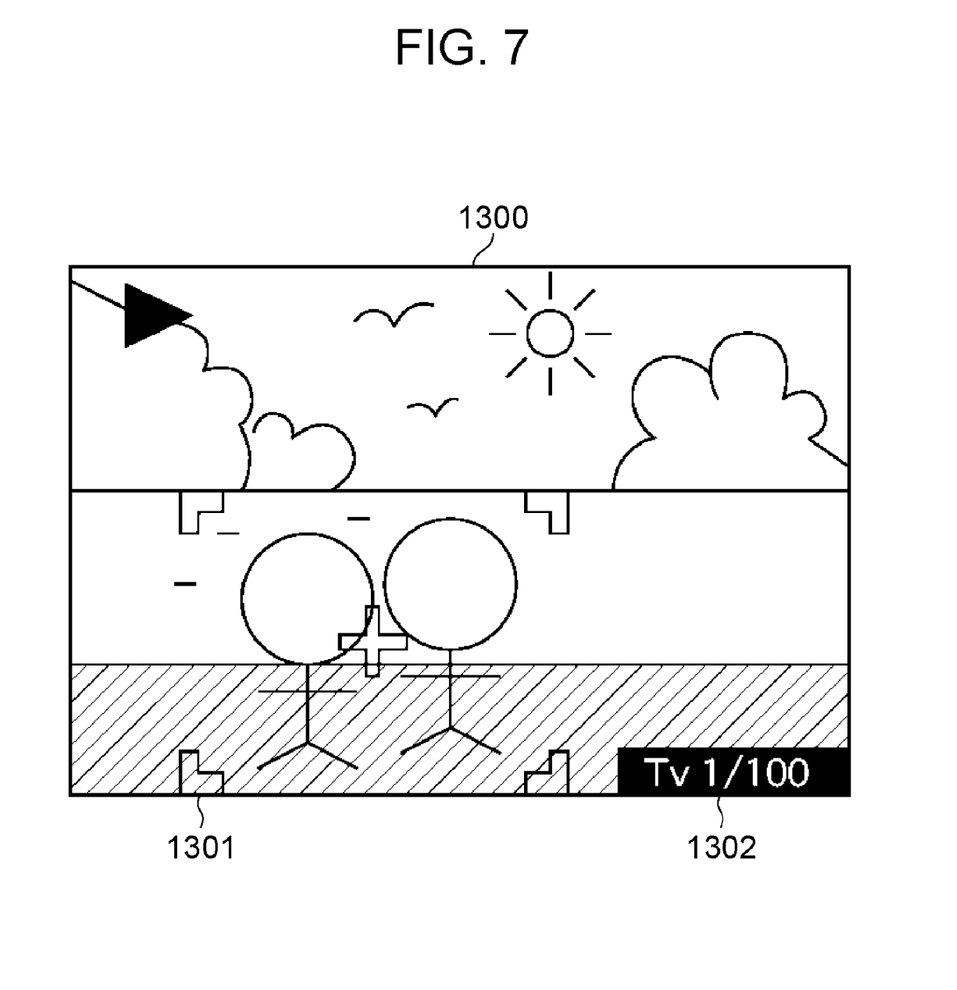
FIG. 7 is a diagram showing an image displayed on a display section when an image recording and reproducing apparatus shown in FIG. 5 captures a still image.

FIG. 7 is a diagram showing an image displayed on a display section 1103 when the image recording and reproducing apparatus shown in FIG. 5 captures a still image. More specifically, FIG. 7 shows an image displayed by the display section 1103 when enlargement is instructed by the still image capturing condition setting unit 1105 shown in FIG. 5.

As shown in FIG. 7, a still image capturing frame 1301 and a still image capturing speed 1302 are displayed in a displayed image 1300 in response to the enlargement instruction. In this case, even if the user gives an instruction to enlarge or reduce the size of the image, the image is not enlarged or reduced but the still image capturing frame 1301 is enlarged or reduced.

An enlarged part (trimming region) may be displayed all over the screen without displaying the still image capturing frame 1301 as shown in FIG. 7. When the magnification factor is increased, a value of "the resolution of an enlarged image/the resolution of the display section 1103" may become equal to or smaller than '1'.

This operation corresponds to so-called digital zoom of digital cameras. Since an enlarged image is generated by interpolating pixels, the image quality decreases in proportion to the magnification factor. To avoid this situation, a user may previously set an enlargement threshold. Alternatively, the enlarged image may be generated by interpolating pixels by an image processing section of a reproducing apparatus without setting the threshold.

At a time point C shown in FIG. 6, the user changes the still image capturing speed 1205 from 1/100 (sec) into 1/200 (sec) through the still image capturing condition setting unit 1105 of the operation section 1104. The storage period (1200/200=6 frames) of the recorded frames 1202 is then calculated. The recorded frames 1202 corresponding to the calculated period are selected and added to generate the display frames 1203. The display frames 1203 are displayed in accordance with the display rate and the resolution of the display section 1103 (After the time point C shown in FIG. 6).

If the user gives an instruction to rotate the reproduced moving image clockwise through the still image capturing condition setting unit 1105 of the operation section 1104, the values of the trimming start coordinates (the start X coordinate 1206 and the start Y coordinate 1207), the values of the trimming end coordinates (the end X coordinate 1208 and the end Y coordinate 1209), and a rotation angle 1210 change (at a time point D shown in FIG. 6).

At a time point E shown in FIG. 6, the user gives an instruction to start capturing a still image through the still image capturing start instructing unit 1106 of the operation section 1104. At this time, the CPU 1110 selects frame images determined in accordance with the set still image capturing condition and performs a control operation to record a still image resulting from combination of the selected frames images.

The still image capturing parameter attaching section 1111 attaches a still image capturing start flag 1204, the various set still image capturing parameters, and the image shooting rate to a representative recorded frame 1202 (blotted part) obtained at the time capturing of the still image is instructed. At this time, the various kinds of information are embedded, as invisible information, in a predetermined data area of the frame image captured as the still image. For example, the various kinds of information are embedded in the blanking, which is a period not displayed as an image.

At a time point F shown in FIG. 6, the user gives an instruction to rotate the reproduced moving image counter-clockwise in the manner similar to the above-described one. At a time point G shown in FIG. 6, the user continuously gives an instruction to capture a still image. In this manner, the still image capturing parameter attaching section 1111 embeds the still image capturing parameters that change instantly and the moving image shooting rate in the blanking (blotted part) of the recorded frames 1202, storage of which is started at respective timings.

Although the still image capturing start flag 1204 is embedded in a representative frame image (blotted part) in this exemplary embodiment, the still image capturing start flag 1204 may be stored in association with a plurality of frame images. For example, the flag may be set for all frames corresponding to the storage period or the flag may be set in a starting and end frames.

Additionally, although a case of embedding information, such as the still image capturing parameters and the moving image shooting rate, in the blanking of the recorded frame 1202 has been described in this exemplary embodiment, the information may be stored separately from the recorded frames 1202 as a management file for managing captured still images.

The controlling section 1108 issues the various still image capturing parameters on the basis of the content set by the user through the still image capturing condition setting unit 1105. The CPU 1110 included in the controlling section 1108 controls various operations in accordance with application programs stored in the memory 1109.

As described above, while recording a moving image at a high frame rate, the image recording and reproducing apparatus according to this exemplary embodiment can capture still images after setting the still image capturing speed corresponding to the pseudo shutter speed and various capturing conditions like a digital camera. That is, the image recording and reproducing apparatus according to this exemplary embodiment can capture still images from reproduced images in a manner of shooting photographs.

In addition, the image recording and reproducing apparatus according to this exemplary embodiment can capture still images at a given timing, namely, a moment intended by a user, from reproduced images. Since the storage period can be freely changed during reproduction, the image recording and reproducing apparatus can determine a final still image using desired values set in consideration for the blurring amount resulting from the set shutter speed. The image recording and reproducing apparatus can save the available space of the storage medium (recording medium) by storing the still image capturing conditions in association with frames.

Although the still image capturing speed, the coordinates, and the rotation angle have been described as the still image capturing parameters in this exemplary embodiment, the still image capturing parameters are not limited to these particular examples. Conditions, such as tint, color density, brightness, and contrast, may be stored as the still image capturing parameters.

Only one still image capturing condition pattern is set in the method according to this exemplary embodiment. However, a plurality of still image capturing conditions may be set. Still images may be captured while switching the still image capturing conditions. For example, the plurality of still image capturing conditions may be assigned to respective channels of a television and switched by changing the channels.

A fourth exemplary embodiment of the present invention will now be described.

Figure 8:
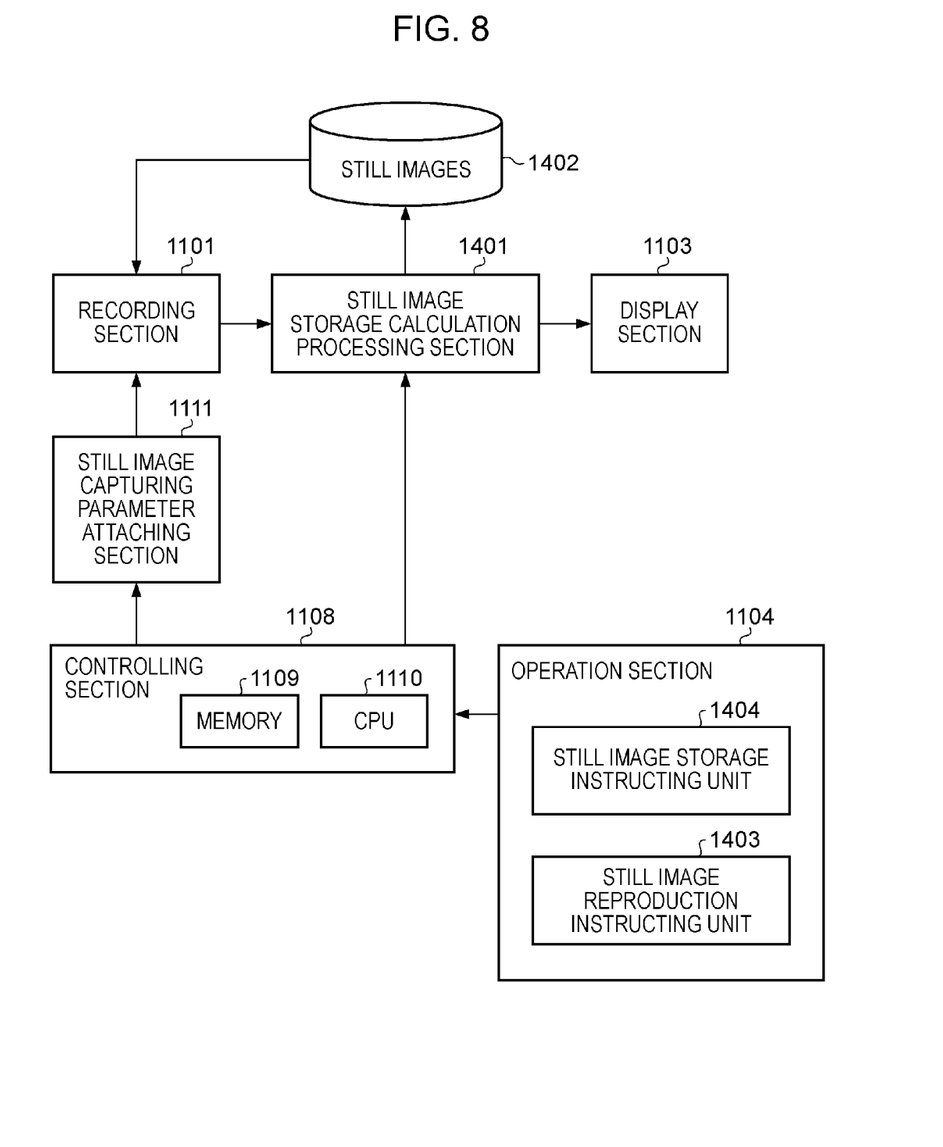
FIG. 8 is a block diagram showing a schematic configuration of an image recording and reproducing apparatus according to a fourth exemplary embodiment of the present invention.

FIG. 8 is a block diagram showing a schematic configuration of an image recording and reproducing apparatus according to the fourth exemplary embodiment of the present invention. Here, processing for storing captured still images 1402 will be described. The configuration shown in FIG. 8 differs from the configuration shown in FIG. 5 that the moving image storage calculation processing section 1102 is replaced with a still image storage calculation processing section 1401 and an operation section 1104 includes a still image reproduction instructing unit 1403 and a still image storage instructing unit 1404. Since other blocks are the same as those shown in FIG. 5, the description thereof is omitted.

As shown in FIG. 6, a recording section 1101 stores recorded frames 1202 (resolution thereof is 8000×4500) as moving image data. A parameter indicating an image shooting rate 1201 (in this case, 1/1200 sec) employed in a high speed image shooting apparatus and still image capturing parameters employed when still images are captured are stored in association with the recorded frames 1202.

Upon a user pressing the still image reproduction instructing unit 1403 of the operation section 1104, the still image storage calculation processing section 1401 reads out the recoded frame 1202 from the recording section 1101.

Upon detecting a still image capturing start flag 1204, which is one of the still image capturing parameters stored in association with the recorded frame 1202, the still image storage calculation processing section 1401 performs the following calculation processing. More specifically, the still image storage calculation processing section 1401 calculates a still image storage calculation period in accordance with a still image capturing speed 1205 stored in association with the frame.

When reproducing and storing a captured still image, the still image storage calculation processing section 1401 selects a plurality of frame images on the basis of the still image capturing parameters and the image shooting rate associated with the recorded frame 1202, calculates the number of frames to be combined, and generates a still image on the basis of the still image capturing parameters.

Regarding a time point E shown in FIG. 6, the still image calculation period is equal to 1200/200=6 frames. During the calculated period, the still image storage calculation processing section 1401 executes addition processing and displays the still image 1402 (corresponding to a shaded display frame at the time point E shown in FIG. 6) resulting from the addition processing on the display section 1103.

When a user attempts to store the still image while browsing the still image displayed on the display section 1103, the still image storage instructing unit 1404 gives an instruction to store the still image. The still image 1402 is then separately stored in the recording section 1101 as a still image file.

An image format of the still image file is based on an image format generally utilized when a digital camera shoots a still image, e.g., exchangeable image file format (Exif).

Figure 9:
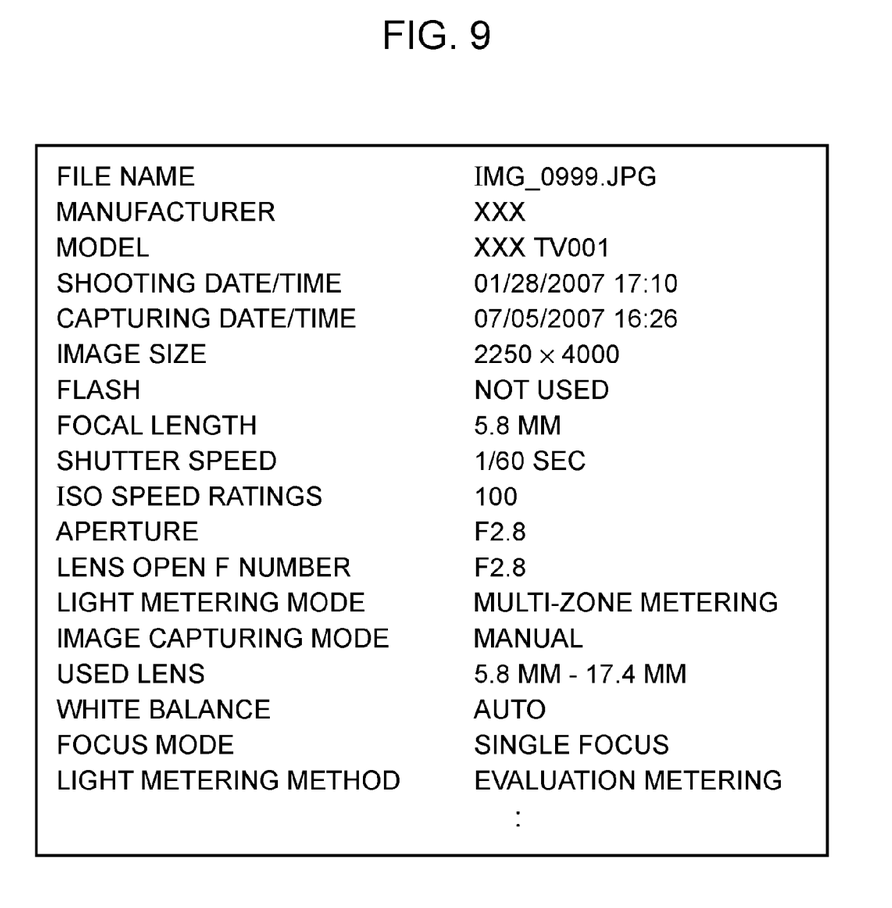
FIG. 9 is a diagram showing an example of an image data format employed when a still image captured by an image recording and reproducing apparatus shown in FIG. 8 is recorded.

FIG. 9 is a diagram showing an example of an image data format employed when a still image captured by the image recording and reproducing apparatus shown in FIG. 8 is recorded. More specifically, FIG. 9 shows a format based on the Exif.

Referring to FIG. 9, among information set in a still image file, attribute data of a shooting date/time of still image data of a still image that a user has captured during reproduction indicates a date/time calculated from a shooting date/time of a moving image. A capturing date/time indicates a date/time that the user has captured a still image, namely, a creation date/time of the still image file. This information is obtained by referring to a real time clock (RTC) included in a reproducing apparatus.

Although the file creation date/time is used as the capturing date/time, the shooting date/time that the user has captured a still image during reproduction may be calculated from a shooting date/time of a moving image or may be selected. The digital camera stores other optical conditions with reference to the moving image data. Alternatively, the other optical conditions may be stored in the still image capturing parameters and the digital camera may store the optical conditions with reference to the still image capturing parameters.

As described above, the image recording and reproducing apparatus according this exemplary embodiment can store a still image file resulting from capturing of a still image in a format similar to that of a file of a still image shot by a digital camera. The image recording and reproducing apparatus can also store a still image file resulting from capturing performed during reproduction separately from moving image data in a manner that the still image is captured with a digital camera. In addition, data is easily exchanged by using a general image format.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-092367 filed on Mar. 31, 2008 and No. 2008-092368 filed on Mar. 31, 2008, which are hereby incorporated by reference herein in their entirety.

What is claimed is:

1. An image recording and reproducing apparatus that records and reproduces image data shot at a frame rate higher than a normal reproduction rate employed during reproduction of a moving image, the apparatus comprising:

a moving image storage period setting unit configured to set a moving image storage period in order to determine the number of frame images to be combined when the image data is reproduced as a moving image;

a still image storage period setting unit configured to set a still image storage period in order to set the number of frame images to be combined when the image data is reproduced as a still image;

a parameter attaching unit configured to attach a parameter indicating the moving image storage period and a parameter indicating the still image storage period to each frame image of the image data;

an image recording unit configured to record the image data attached with the parameters by the parameter attaching unit; and a still image recording instructing unit configured to give an instruction to start recording a still image, wherein the parameter attaching unit attaches information indicating the start of recording of the still image to a frame image of the image data in response to the still image recording start instruction received during a recording operation performed by the image recording unit.

2. The apparatus according to claim 1, wherein the parameter attaching unit attaches information for specifying a reproduction rate of the image data to each frame image of the image data.

3. The apparatus according to claim 1, further comprising:
a reproducing unit configured to reproduce image data recorded by the image recording unit,
wherein the reproducing unit includes:
a moving image frame generating unit configured to determine the number of frame images to be combined in accordance with the parameter indicating the moving image storage period attached to the recorded image data, to combine the reproduced frame images in accordance with the determined number of frame images, and to generate a moving-image frame image, and
a still image frame generating unit configured to determine the number of frame images to be combined in accordance with the parameter indicating the still image storage period attached to the recorded image data, to combine the reproduced frame images in accordance with the determined number of frame images, and to generate a still-image frame image.

4. The apparatus according to claim 3, wherein the still image frame generating unit generates the still-image frame image in accordance with the information indicating the start of recording of the still image attached to the recorded image data.

5. The apparatus according to claim 2, further comprising:
an operation unit configured to allow a user to freely set values of the moving image storage period, the still image storage period, and the reproduction rate.

6. The apparatus according to claim 1, wherein the parameter attaching unit attaches a plurality of parameters to a blanking period of each frame image included in the image data, a header of the image data, or a footer of the image data.

7. The apparatus according to claim 1, wherein the parameter attaching unit generates a management file of a plurality of parameters separately from a file of the image data.

8. An image reproducing apparatus that reproduces moving image data recorded at a frame rate higher than a normal reproduction rate employed during reproduction of a moving image, the apparatus comprising:
a generating unit configured to reproduce the moving image data recorded on a recording medium and combine a plurality of frame images included in the reproduced moving image data to generate a frame image to be displayed;
a still image capturing condition setting unit configured to set a still image capturing condition for determining the number of frame images to be combined in the case that part of the moving image data is reproduced as a still image;
a still image capturing instructing unit configured to give an instruction to start capturing a still image; and
a controlling unit, in response to the still image capturing start instruction received during a reproduction operation performed using the frame image generated by the generating unit, configured to select a plurality of frame images corresponding to the number of frame images to be combined being determined in accordance with the still image capturing condition set by the still image capturing condition setting unit, and set a still image capturing parameter for each of the plurality of selected frame images.

9. The apparatus according to claim 8, further comprising:
a still image capturing information attaching unit configured to attach the still image capturing parameter in a predetermined data area of the plurality of selected frame images included in the moving image data recorded on the recording medium in accordance with the still image capturing condition under control of the controlling unit.

10. The apparatus according to claim 8, further comprising:
a still image reproduction instructing unit,
wherein the generating unit selects and combines, in response to reception of an instruction from the still image reproduction instructing unit, frame images from the moving image data recorded on the recording medium in accordance with the still image capturing parameter to generate a still image to be displayed.

* * * * *